US012627002B2

(12) United States Patent
Lee et al.

(10) Patent No.: US 12,627,002 B2
(45) Date of Patent: *May 12, 2026

(54) SEPARATOR FOR ELECTROCHEMICAL DEVICE AND METHOD FOR MANUFACTURING THE SAME

(71) Applicant: LG ENERGY SOLUTION, LTD., Seoul (KR)

(72) Inventors: Seung-Hyun Lee, Daejeon (KR); Dong-Wook Sung, Daejeon (KR); Hyun-Kyung Shin, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 509 days.

This patent is subject to a terminal disclaimer.

(21) Appl. No.: 18/298,603

(22) Filed: Apr. 11, 2023

(65) Prior Publication Data

US 2023/0246298 A1 Aug. 3, 2023

Related U.S. Application Data

(63) Continuation of application No. 16/628,499, filed as application No. PCT/KR2019/001311 on Jan. 30, 2019, now Pat. No. 11,658,365.

(30) Foreign Application Priority Data

Jan. 30, 2018 (KR) ........................ 10-2018-0011649

(51) Int. Cl.
H01M 50/446 (2021.01)
H01M 4/62 (2006.01)
(Continued)

(52) U.S. Cl.
CPC ......... H01M 50/446 (2021.01); H01M 4/623 (2013.01); H01M 50/403 (2021.01);
(Continued)

(58) Field of Classification Search
CPC ............. H01M 50/431; H01M 50/446; H01M 50/449; H01M 50/451; H01M 50/457
See application file for complete search history.

(56) References Cited

U.S. PATENT DOCUMENTS

2007/0122716 A1 5/2007 Seo et al.
2011/0027642 A1 2/2011 Lee et al.
(Continued)

FOREIGN PATENT DOCUMENTS

CN 102770984 A 11/2012
CN 104425788 A 3/2015
(Continued)

OTHER PUBLICATIONS

Extended European Search Report for European Application No. 19747185.7, dated Nov. 27, 2020.
(Continued)

*Primary Examiner* — Imran Akram
(74) *Attorney, Agent, or Firm* — Birch, Stewart, Kolash & Birch, LLP

(57) ABSTRACT

A separator for an electrochemical device including a heat resistant layer and an adhesive layer and a method for manufacturing the same. The separator uses a heat resistant polymer having a high melting point for a heat resistant layer and shows excellent peel strength between the separator substrate and the heat resistant layer and high adhesion between the separator and an electrode.

15 Claims, 1 Drawing Sheet

100

(51) Int. Cl.
    *H01M 50/403*          (2021.01)
    *H01M 50/426*          (2021.01)
    *H01M 50/449*          (2021.01)
    *H01M 50/489*          (2021.01)
(52) U.S. Cl.
    CPC ....... *H01M 50/426* (2021.01); *H01M 50/449*
                (2021.01); *H01M 50/489* (2021.01)

(56) References Cited

U.S. PATENT DOCUMENTS

| | | | |
|---|---|---|---|
| 2012/0015228 A1 | 1/2012 | Yoon et al. | |
| 2012/0115036 A1 | 5/2012 | Lee et al. | |
| 2012/0258348 A1 | 10/2012 | Hayakawa et al. | |
| 2014/0050965 A1 | 2/2014 | Ha et al. | |
| 2014/0370358 A1 | 12/2014 | Hong et al. | |
| 2015/0093627 A1 | 4/2015 | Busch et al. | |
| 2015/0162588 A1 | 6/2015 | Lee et al. | |
| 2015/0200387 A1 | 7/2015 | Nishikawa et al. | |
| 2015/0263325 A1* | 9/2015 | Honda | H01M 50/434 |
| | | | 429/144 |
| 2016/0149187 A1 | 5/2016 | Cho et al. | |
| 2016/0156010 A1 | 6/2016 | Chen et al. | |
| 2016/0218340 A1 | 7/2016 | Ryu et al. | |
| 2017/0338461 A1 | 11/2017 | Seo et al. | |
| 2018/0097216 A1 | 4/2018 | Joo et al. | |
| 2019/0044118 A1 | 2/2019 | Sakurai et al. | |
| 2019/0103593 A1 | 4/2019 | Kai et al. | |

FOREIGN PATENT DOCUMENTS

| | | | | |
|---|---|---|---|---|
| CN | 104838519 A | 8/2015 | | |
| CN | 106328865 A | 1/2017 | | |
| CN | 106910858 A | 6/2017 | | |
| CN | 107438912 A | 12/2017 | | |
| EP | 1 881 545 A1 | 1/2008 | | |
| JP | 2007-273443 A | 10/2007 | | |
| JP | 2014-30951 A | 2/2014 | | |
| JP | 2016-207616 A | 12/2016 | | |
| KR | 10-2007-0088678 A | 8/2007 | | |
| KR | 10-2009-0107442 A | 10/2009 | | |
| KR | 10-2010-0113030 A | 10/2010 | | |
| KR | 10-2012-0093772 A | 8/2012 | | |
| KR | 10-2013-0066746 A | 6/2013 | | |
| KR | 10-2015-0070979 A | 6/2015 | | |
| KR | 10-2016-0061164 A | 5/2016 | | |
| KR | 10-2016-0109669 A | 9/2016 | | |
| KR | 10-2017-0068979 A | 6/2017 | | |
| KR | 10-2017-0129645 A | 11/2017 | | |
| WO | WO-2016159720 A1 * | 10/2016 | ......... | H01M 50/443 |
| WO | WO 2017/169845 A1 | 10/2017 | | |

OTHER PUBLICATIONS

International Search Report issued in PCT/KR2019/001311 (PCT/ISA/210), dated May 10, 2019.

* cited by examiner

SEPARATOR FOR ELECTROCHEMICAL DEVICE AND METHOD FOR MANUFACTURING THE SAME

CROSS-REFERENCE TO RELATED APPLICATIONS

This application is a Continuation of application Ser. No. 16/628,499 filed on Jan. 3, 2020, which is the U.S. National Phase of PCT/KR2019/001311, filed Jan. 30, 2019, and which claims priority under 35 U.S.C. § 119(a) to Application No. 10-2018-0011649 filed on Jan. 30, 2018, in the Republic of Korea, the entire contents of all of which are expressly incorporated by reference into the present application.

TECHNICAL FIELD

The present disclosure relates to a separator for an electrochemical device which has high heat resistance and excellent peel strength between a substrate and a heat resistant layer, and a method for manufacturing the same.

BACKGROUND ART

As technological development and demand for mobile instruments have been increased, secondary batteries have been increasingly in demand as energy sources. Among such secondary batteries, lithium secondary batteries having high energy density and operating voltage, long cycle life and a low discharge rate have been commercialized and used widely.

Such a lithium secondary battery has been developed into a model capable of realizing high voltage and high capacity according to consumers' needs. To realize high capacity, required is a process of optimizing four main elements of a lithium secondary battery, including a positive electrode material, a negative electrode material, a separator and an electrolyte, in a limited space.

Among the elements, a separator is an insulating film for electrically insulating a positive electrode and a negative electrode from each other and an important constitutional element in terms of safety of battery. When a secondary battery is overheated to cause thermal runaway or a separator is perforated, there is great concern about explosion. Particularly, a polyolefin-based porous substrate used conventionally as a separator for an electrochemical device shows a severe heat shrinking behavior at a temperature of 100° C. or higher due to its material property and a characteristic during its manufacturing process, including orientation, thereby causing a short-circuit between a positive electrode and a negative electrode.

To solve the above-mentioned safety problems of an electrochemical device, there has been suggested an organic/inorganic composite separator having a porous coating layer formed by applying a mixture of inorganic particles with a binder polymer onto at least one surface of a porous substrate having a plurality of pores. In the organic/inorganic composite separator, the inorganic particles in the porous coating layer coated on the polyolefin-based porous substrate functions as a kind of spacer which can retain the physical shape of a porous active layer, and thus can inhibit the polyolefin-based porous substrate from heat shrinking upon overheating of an electrochemical device. In addition, interstitial volumes are present among the inorganic particles to form micropores.

To allow the porous coating layer coated on the organic/inorganic composite separator to inhibit heat shrinking of the polyolefin-based porous substrate sufficiently, it is required that the inorganic particles are incorporated sufficiently at least in a predetermined amount. However, as the content of a binder polymer is decreased relatively due to an increase in content of the inorganic particles, adhesion between the porous coating layer and the polyolefin-based porous substrate and adhesion between the porous coating layer and an electrode are degraded. Therefore, the porous coating layer becomes less effective for inhibiting heat shrinking of the polyolefin-based porous substrate. In this case, it is difficult to inhibit a short circuit between a positive electrode and a negative electrode, when a battery is overheated. In addition, the electrode may be spaced apart easily from the separator, resulting in the problems of an increase in ion conductivity and degradation of resistance characteristics. On the other hand, when the content of a binder polymer in the porous coating layer is increased in order to prevent detachment of inorganic particles, the content of inorganic particles is decreased relatively. Thus, the effect of inhibiting heat shrinking of the polyolefin-based porous substrate may be degraded, and the battery performance may also be degraded due to a decrease in porosity in the porous coating layer.

DISCLOSURE

Technical Problem

The present disclosure is directed to providing a separator for an electrochemical device and a method for manufacturing the same. The present disclosure is also directed to providing a separator, which has high peel strength between a separator substrate and a heat resistant layer and excellent adhesion between a separator and an electrode, by using a heat resistant polymer having a high melting point in a heat resistant layer, as well as a method for manufacturing the same. These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

According to the first embodiment of the present disclosure, there is provided a separator for an electrochemical device which includes: a porous substrate; a heat resistant layer formed on at least one surface of the porous substrate; and an adhesive layer formed on the surface of the heat resistant layer opposite the porous substrate, wherein the heat resistant layer includes inorganic particles and a heat resistant binder resin, the adhesive layer includes at least two adhesive binder resins, the heat resistant binder resin has a melting point (Tm) of 150° C. or higher, and the adhesive layer includes a fluorinated binder resin and a non-fluorinated binder resin as adhesive binder resins.

According to the second embodiment of the present disclosure, there is provided the separator for an electrochemical device as defined in the first embodiment, wherein the heat resistant layer includes the heat resistant binder resin in an amount of 1 wt % to 20 wt % based on 100 wt % of the heat resistant layer.

According to the third embodiment of the present disclosure, there is provided the separator for an electrochemical device as defined in the second embodiment, wherein the heat resistant layer includes a heat resistant binder resin having a Tm of 150° C. or higher, and the heat resistant binder resin is present in an amount larger than 90 wt % based on 100 wt % of the binder resin present in the heat resistant layer.

According to the fourth embodiment of the present disclosure, there is provided the separator for an electrochemical device as defined in any one of the first to the third embodiments, wherein the heat resistant layer includes a pore path passing through the thickness direction of the heat resistant layer by one pore or by interconnection of two or more open pores, and either or both of the fluorinated binder resin and the non-fluorinated binder resin of the adhesive layer are introduced through at least one pore path so that the heat resistant layer is bound with the surface of the porous substrate.

According to the fifth embodiment of the present disclosure, there is provided the separator for an electrochemical device as defined in any one of the first to the fourth embodiments, which has a shrinkage of 25% or less in the transverse direction (TD) and machine direction (MD) after it is allowed to stand at 150° C. for 30 minutes.

According to the sixth embodiment of the present disclosure, there is provided the separator for an electrochemical device as defined in any one of the first to the fifth embodiments, which has a break down voltage of 1.8 kV or higher.

According to the seventh embodiment of the present disclosure, there is provided the separator for an electrochemical device as defined in any one of the first to the sixth embodiments, which shows a peel strength of 20 gf/15 mm or more between the heat resistant layer and the porous substrate.

According to the eighth embodiment of the present disclosure, there is provided the separator for an electrochemical device as defined in any one of the first to the seventh embodiments, wherein the heat resistant binder resin includes polyacetal, polysulfone (PSF), polyethersulfone (PES), polyetherimide (PEI), polyphenylene sulfide (PPS), polyetherether ketone (PEEK), polyarylate (PA), polycarbonate, polyamideimide (PAI), polyimide (PI), polyamide, fully aromatic polyamide (aramid), polyphenylene oxide, polybutylene terephthalate, polyethylene terephthate, polyether sulfone, polyether ketone or a mixture of at least two of them.

According to the ninth embodiment of the present disclosure, there is provided the separator for an electrochemical device as defined in any one of the first to the eighth embodiments, wherein the fluorinated binder resin includes a polyvinylene fluoride (PVDF)-based polymer resin containing vinylidene fluoride (VDF) as a monomer.

According to the tenth embodiment of the present disclosure, there is provided the separator for an electrochemical device as defined in any one of the first to the ninth embodiments, wherein the fluorinated binder resin includes a copolymer of vinylidene fluoride (VDF) with a comonomer, and the comonomer includes at least one selected from hexafluoropropylene (HFP), chlorotrifluoroethylene (CTFE), hexafluoroisobutylene, perfluorobutyl ethylene, perfluoropropyl vinyl ether (PPVE), perfluoroethyl vinyl ether (PEVE), perfluromethyl vinyl ether (PMVE), perfluoro-2,2-dimethyl-1,3-dioxole (PDD), perfluoro-2-methylene-4-methyl-1,3-dioxolane (PMD), and combinations thereof.

According to the eleventh embodiment of the present disclosure, there is provided the separator for an electrochemical device as defined in any one of the first to the tenth embodiments, wherein the non-fluorinated binder resin includes a cyano group-containing copolymer in which hydroxyl groups are substituted with cyano groups.

According to the twelfth embodiment of the present disclosure, there is provided a method for manufacturing the separator as defined in any one of the first to the eleventh embodiments, the method including the steps of: (S10) forming a heat resistant layer on the surface of a porous substrate; (S20) applying a polymer solution for forming an adhesive layer to the surface of the heat resistant layer opposite the porous substrate; and (S30) drying the applied polymer solution to form an adhesive layer, wherein the drying in step (S30) is carried out under a humidifying treatment condition at a relative humidity of 20-50%.

According to the thirteenth embodiment of the present disclosure, there is provided the method as defined in the twelfth embodiment, wherein the polymer solution for forming an adhesive layer includes a fluorinated binder resin, a non-fluorinated binder resin, a solvent and a non-solvent.

Advantageous Effects

The separator according to the present disclosure includes a heat resistant layer including a heat resistant polymer material having a high melting point. Thus, the separator shows high heat resistance and thermal stability, and thus provides a battery with improved heat resistance. In addition, the separator according to the present disclosure shows high peel strength between the heat resistant layer and the separator substrate and high interfacial adhesion between the heat resistant layer and an electrode. Therefore, it is possible to improve ion conductivity and resistance characteristics as well as thermal safety of a battery. Meanwhile, the method for manufacturing a separator according to the present disclosure allows improvement of peel strength between the heat resistant layer and the separator substrate merely by carrying out an adhesive layer-forming step (step of forming an adhesive layer on the top of the heat resistant layer) once, thereby providing high processing efficiency.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, the shapes, sizes, scales or proportions of some elements in the drawings may be exaggerated for the purpose of clearer description.

BEST MODE

Figure 1:
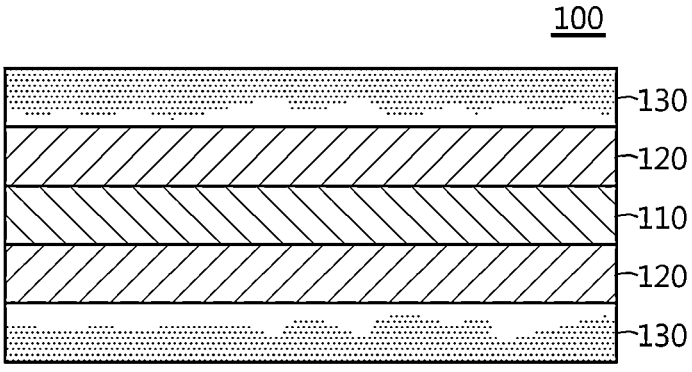
FIG. 1 is a schematic sectional view illustrating the separator according to an embodiment of the present disclosure.
Figure 2:
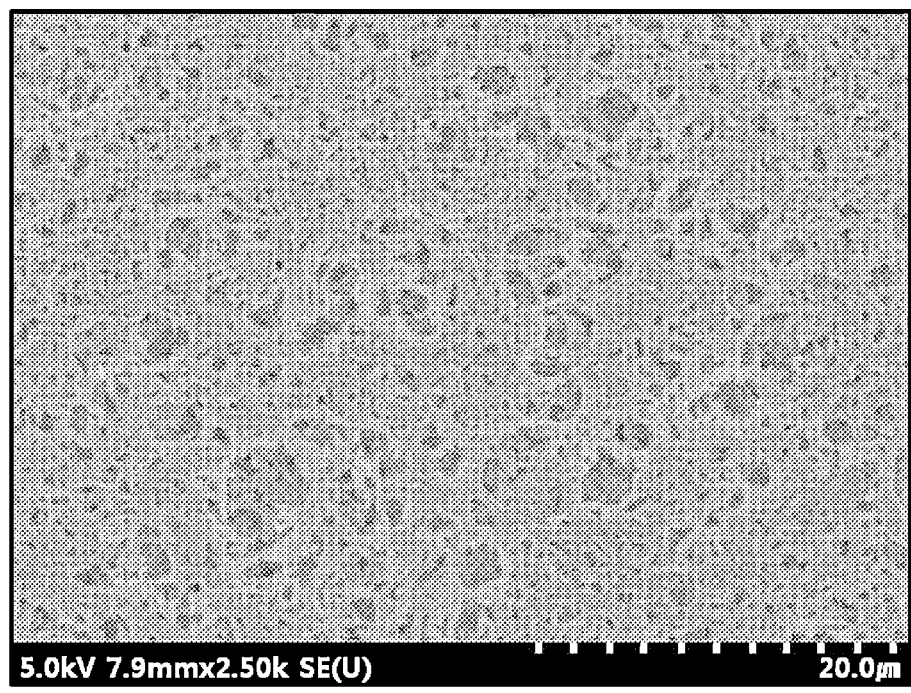
FIG. 2 is a scanning electron microscopic (SEM) image illustrating an adhesive layer formed on the outermost surface of the separator according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

As used herein, the expression 'one portion is connected to another portion' covers not only 'a portion is directly connected to another portion' but also 'one portion is connected indirectly to another portion' by way of the other element interposed between them.

Throughout the specification, the expression 'a part ⌈includes⌉ an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

Hereinafter, the separator according to the present disclosure will be explained in more detail with reference to the accompanying drawings.

Exemplary embodiments now will be described more fully hereinafter. However, the following embodiments are not intended to limit the scope of the present disclosure.

In one aspect, there are provided a separator for an electrochemical device and a method for manufacturing the same. For example, the separator is provide with a heat resistant layer including a heat resistant polymer, such as aramid, having a high $T_m$ (150° C. or higher, or 180° C. or higher). Thus, the separator according to the present disclosure has significantly high thermal safety. In addition, the separator for an electrochemical device according to the present disclosure includes an adhesive layer formed on the surface of the heat resistant layer. After the binder ingredient of the adhesive layer is introduced through at least one pore of the heat resistant layer, the adhesive layer is bound with the heat resistant layer, the heat resistant layer is bound with the porous substrate and the adhesive layer is bound with the porous substrate, by means of the binder ingredient. As a result, it is possible to improve peel strength between the porous substrate and the heat resistant layer.

According to an embodiment of the present disclosure, the separator includes a porous substrate, a heat resistant layer formed on either surface or both surfaces of the porous substrate, and an adhesive layer formed on the surface of the heat resistant layer, wherein the heat resistant layer includes inorganic particles and a heat resistant binder resin.

According to another embodiment of the present disclosure, the separator may further include a ceramic layer between the heat resistant layer and the adhesive layer, or between the porous substrate and the heat resistant layer.

Preferably, the ceramic layer is disposed between the heat resistant layer and the adhesive layer.

According to the present disclosure, the porous substrate is not particularly limited, as long as it may be used conventionally as a separator material for an electrochemical device. The porous substrate may be a thin film including a polymer material. Non-limiting examples of the polymer material include at least one selected from polyolefin resins, polyethylene terephthalate, polybutylene terephthalate, polyacetal, polyamide, polycarbonate, polyimide, polyether ether ketone, polyether sulfone, polyphenylene oxide, polyphenylene sulfide, polyethylene naphthalene and combinations thereof. In addition, the porous substrate may be a non-woven web or a porous polymer film including such a polymer material, or a laminate including two or more of the polymer materials. Particularly, the porous substrate is any one of the following a) to e):

a) A porous film formed by melting and extruding a polymer resin;

b) A multilayer film formed by stacking two or more layers of the porous films of a);

c) A non-woven web formed by integrating filaments obtained by melting/spinning a polymer resin;

d) A multilayer film formed by stacking two or more layers of the non-woven webs of b); and e) A porous composite film having a multilayer structure including two or more of a) to d).

According to the present disclosure, the porous substrate may have a thickness of 5-50 μm. The thickness of the separator substrate is not limited to the above-defined range. However, when the thickness is excessively smaller than the lower limit, mechanical properties are degraded and the separator may be damaged easily during the use of a battery. Meanwhile, although the pore size and porosity of the pores present in the porous substrate are not limited particularly, it is preferred that the pore size and porosity are 0.01-50 μm and 10-95%, respectively.

Meanwhile, as described hereinafter, the separator according to the present disclosure is provided with a heat resistant layer, which includes a binder resin having a high $T_m$. According to an embodiment of the present disclosure, the porous substrate may have a $T_m$ of 130-180° C. Thus, it is required to consider an adequate range of heat resistant temperature in terms of stability so that a shut-down function may be realized upon a rapid increase in internal temperature, such as thermal runaway, of a battery, while preventing the porous substrate from shrinking in the conventional battery operating temperature range.

Meanwhile, according to the present disclosure, the porosity and pore diameter may be determined from scanning electron microscopic (SEM) images, by using a mercury porosimeter, or through the BET6-point method based on nitrogen gas adsorption flow using a porosimetry analyzer (e.g. Belsorp-II mini, Bell Japan Inc.).

According to an embodiment of the present disclosure, the heat resistant layer includes a mixture of a plurality of inorganic particles with a heat resistant binder resin. In the separator according to the present disclosure, the surface of the porous substrate is coated with the mixture of a heat resistant polymer binder with inorganic particles. As a result, it is possible to provide the porous substrate with improved heat resistance and mechanical properties.

FIG. 1 is a schematic sectional view illustrating the separator 100 according to an embodiment of the present disclosure. The separator 100 includes a porous substrate 110 and a heat resistant layer 120 formed on both surfaces of the porous substrate 110. In FIG. 1, heat resistant layers are formed on both surfaces of the porous substrate. However, according to another embodiment of the present disclosure, the separator may include a heat resistant layer formed on either surface of the porous substrate.

According to an embodiment of the present disclosure, the heat resistant layer may have a thickness of 1-50 μm. Within the above-defined range, the heat resistant layer may have an adequate thickness. For example, the thickness may be 5 μm or more, 10 μm or more, 15 μm or more, 20 μm or more, 25 μm or more, or 30 μm or more. In addition, the heat resistant layer may be 45 μm or less, 40 μm or less, 35 μm or less, 30 μm or less, 25 μm or less, 20 μm or less, or 15 μm or less. When the thickness of the heat resistant layer satisfies the above-defined range, it is effective to prevent the separator from heat shrinking and it is possible to provide a desired level of mechanical properties, such as improved perforation strength.

According to an embodiment of the present disclosure, there is no particular limitation in the size of inorganic particles. Considering formation of a heat resistant layer having a uniform thickness and an adequate porosity, the inorganic particles may have a diameter of about 0.001-10 μm. When the size of the inorganic particles satisfies the above-defined range, it is easy to maintain dispersbility and to control physical properties of a separator with ease, and it is possible to prevent an increase in thickness of the porous coating layer and to improve mechanical properties. In addition, it is less probable that an internal short circuit occurs during charge/discharge of a battery due to an excessively large pore size. According to an embodiment of the present disclosure, the inorganic particles may be controlled within the above-defined range, considering an adequate porosity and pore size. For example, the diameter may be 10 μm or less, 5 μm or less, 3 μm or less, 2 μm or less, 1 μm or less, or 500 nm or less, within the above-defined range. The diameter may be controlled suitably to 50 nm or more, 100 nm or more, 300 nm or more, 500 nm or more, 1 μm or more, 3 μm or more, or 5 μm or more.

According to the present disclosure, the inorganic particles preferably have physical properties which are not changed even at a high temperature of 200° C. or higher. In addition, the inorganic particles are not particularly limited, as long as they are electrochemically stable. In other words, the inorganic particles are not particularly limited, as long as they cause no oxidation and/or reduction in the operating voltage range (e.g. 0-5V based on Li/Li$^+$) of an applicable electrochemical device. According to an embodiment of the present disclosure, particular examples of the inorganic particles include BaTiO$_3$, Pb(ZrTi)O$_3$ (PZT), Pb$_{1-x}$La$_x$Zr$_{1-y}$Ti$_y$O$_3$ (PLZT, wherein 0<x<1, 0<y<1), Pb(Mg$_{1/3}$Nb$_{2/3}$)O$_{3-x}$—PbTiO$_3$ (PMN-PT, wherein 0<x<1), hafnia (HfO$_2$), SrTiO$_3$, SnO$_2$, CeO$_2$, MgOH$_2$, MgO, NiO, CaO, ZnO, ZrO$_2$, Y$_2$O$_3$, Al$_2$O$_3$, SiC, TiO$_2$, and combinations thereof. Meanwhile, according to the present disclosure, the heat resistant layer may have an adequately controlled pore size and porosity of 0.001-10 μm and 5-95%, respectively.

Meanwhile, the heat resistant layer may have a microporous structure formed by interstitial volumes among the inorganic particles. Herein, 'interstitial volume' means a space defined by the inorganic particles that are in contact with each other substantially.

In the heat resistant layer, the inorganic particles are bound with each other in a dot-to-dot or face-to-face manner by means of the binder resin so that the particles may be maintained in a state of integrated assembly. In addition, the binder resin provides binding force between the heat resistant layer and the separator substrate. According to the present disclosure, the binder resin may include a heat resistant binder resin as the first binder resin. According to an embodiment of the present disclosure, the heat resistant binder resin is a polymer resin having a high melting point (T$_m$) of 150° C. or higher, 180° C. or higher, 200° C. or higher, or 250° C. or higher. Non-limiting examples of the heat resistant binder resin include polyacetal, polysulfone (PSF), polyethersulfone (PES), polyetherimide (PEI), polyphenylene sulfide (PPS), polyetherether ketone (PEEK), polyarylate (PA), polycarbonate, polyamideimide (PAI), polyimide (PI), polyamide, fully aromatic polyamide (aramid), polyphenylene oxide, polybutylene terephthalate, polyethylene terephthate, polyether sulfone and polyether ketone, and the heat resistant binder resin may include at least one of them. According to an embodiment of the present disclosure, the heat resistant binder resin may include at least one of polyamide and fully aromatic polyamide. In addition, according to another embodiment of the present disclosure, the polyamide has at least 85% of amide bonds bound between aromatic rings and may have a para-aramid structure having an amide bond bound at the para-position of a benzene ring or a meta-aramid structure having an amide bond bound at the meta-position of a benzene ring.

Meanwhile, according to an embodiment of the present disclosure, if necessary, an adhesive binder resin (second binder resin) used conventionally for a separator for an electrochemical device may be further incorporated in order to increase the binding force among the inorganic particles. However, when the content of the heat resistant binder resin is decreased, it is not possible to realize an effect of improving thermal safety and reducing shrinkage of the separator to a desired level. Thus, it is preferred that the content of the second binder resin is less than 10 wt % based on 100 wt % of the total binder resins contained in the heat resistant layer. In other words, the content of the heat resistant binder resin is larger than 90 wt % based on 100 wt % of the total binder resins contained in the heat resistant layer. For example, the content of the heat resistant binder resin may be 92 wt % or more, 93 wt % or more, or 95 wt % or more.

Meanwhile, according to an embodiment of the present disclosure, the second binder resin may be incorporated by phase separation and infiltration of the non-fluorinated binder resin contained in slurry for forming an adhesive layer through the interstitial volumes of the heat resistant layer from the adhesive layer. In this manner, the non-fluorinated binder resin is infiltrated to the heat resistant layer through the interstitial volumes and reaches the porous substrate, and thus the peel strength between the heat resistant layer and the porous substrate is improved effectively.

Non-limiting examples of the second binder resin include any one selected from the group consisting of polyvinylidene fluoride (PVdF), polyvinylidene fluoride-co-hexafluoropropylene, polyvinylidene fluoride-co-trichloroethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cyanoethylpullulan, cyanoethyl polyvinylalchol, cyanoethyl cellulose, cyanoethyl sucrose, pullulan, carboxymethyl cellulose, and combinations thereof.

Meanwhile, according to an embodiment of the present disclosure, it is not essentially required for the second binder resin to have ion conductivity. However, when using a polymer having ion conductivity, it is possible to further improve the performance of an electrochemical device.

Therefore, it is preferred that the second binder resin has a dielectric constant as high as possible.

In addition, the second binder resin may have a glass transition temperature ($T_g$) of −100 to 200° C. This is because such a binder resin can improve the mechanical properties, such as flexibility and elasticity, of the finished porous coating layer. Such a binder resin stably fixes binding between the inorganic particles, and thus contributes to prevention of degradation of mechanical properties of the finished porous coating layer.

Meanwhile, according to the present disclosure, the content of the binder resins (i.e. combined weight of the first binder resin with the second binder resin) contained in the heat resistant layer may be 1-20 wt %, 1-15 wt %, or 1-10 wt %, based on 100 wt % of the heat resistant layer.

In addition, according to the present disclosure, a ceramic layer may be further formed on the surface of the heat resistant layer, and the ceramic layer includes the second inorganic particles and the third binder resin. Non-limiting examples of the third binder resin include any one selected from the group consisting of polyvinylidene fluoride (PVdF), polyvinylidene fluoride-co-hexafluoropropylene, polyvinylidene fluoride-co-trichloroethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cyanoethylpullulan, cyanoethylpolyvinylalchol, cyanoethyl cellulose, cyanoethyl sucrose, pullulan, carboxymethyl cellulose, and combinations thereof.

According to the present disclosure, the second inorganic particles preferably have physical properties which are not changed even at a high temperature of 200° C. or higher. In addition, the inorganic particles are not particularly limited, as long as they are electrochemically stable. In other words, the inorganic particles are not particularly limited, as long as they cause no oxidation and/or reduction in the operating voltage range (e.g. 0-5V based on $Li/Li^+$) of an applicable electrochemical device. According to an embodiment of the present disclosure, particular examples of the inorganic particles include $BaTiO_3$, $Pb(ZrTi)O_3$ (PZT), $Pb_{1-x}La_xZr_{1-y}Ti_yO_3$ (PLZT, wherein $0<x<1$, $0<y<1$), $Pb(Mg_{1/3}Nb_{2/3})O_{3-x}$—$PbTiO_3$(PMN-PT, wherein $0<x<1$), hafnia ($HfO_2$), $SrTiO_3$, $SnO_2$, $CeO_2$, $MgOH_2$, $MgO$, $NiO$, $CaO$, $ZnO$, $ZrO_2$, $Y_2O_3$, $Al_2O_3$, $SiC$, $TiO_2$, and combinations thereof. In addition, the same description of the first inorganic particles, including the diameter of the inorganic particles, may be applied to the second inorganic particles. According to the present disclosure, the inorganic material layer may have an adequately controlled pore size and porosity of 0.001-10 µm and 5-95%, respectively.

Meanwhile, each of the heat resistant layer and the ceramic layer may independently have a microporous structure formed by interstitial volumes among the inorganic particles, wherein 'interstitial volume' means a space defined by the inorganic particles that are in contact with each other substantially. According to an embodiment of the present disclosure, at least one of the heat resistant layer and the ceramic layer may have such a microporous structure formed by interstitial volumes.

When the ceramic layer is further provided in addition to the heat resistant layer as described above, it is possible to improve durability as well as heat resistance of the separator. For example, durability of the separator is improved.

In addition, the separator is provided with an adhesive layer on the outermost surface thereof. For example, when an inorganic material layer is not formed, an adhesive layer 130 may be further provided on the surface of the heat resistant layer. According to the present disclosure, the adhesive layer includes at least two types of adhesive binder resins. Particularly, the adhesive layer includes a fluorinated binder resin (adhesive binder resin a) and a non-fluorinated binder resin (adhesive binder resin b). According to an embodiment of the present disclosure, the content of the adhesive binder resin b (non-fluorinated binder resin) is 1-20 wt % based on 100 wt % of the binder resins in the adhesive layer. For example, the content of the adhesive binder resin b may be 15 wt % or less, 10 wt % or less, or 5 wt % or less, within the above-defined range.

Meanwhile, according to the present disclosure, the adhesive layer 130 may have a microporous structure. For example, the microporous structure of the adhesive layer shows a fine three-dimensional porous structure formed by interconnection of adhesive binder resin backbones through a polymer phase separation phenomenon using a non-solvent, as described hereinafter. Particularly, the pores may show a rectangular finger-like structure, Benard cell structure or a mesoporous structure in the thickness direction of the separator. In other words, since the adhesive layer includes no inorganic particles, it does not show a porous structure formed by interstitial volumes among the inorganic particles. The microporous structure of the adhesive layer may largely result from the process for forming the adhesive layer, such as humidified phase separation during the drying of the fluorinated binder resin. In addition, the microporous structure of the adhesive layer may result from the process for forming the adhesive layer, such as drying of the binder solvent during drying of the adhesive layer.

According to the present disclosure, it is possible to provide an effect of improving peel strength between the heat resistant layer and the porous substrate by virtue of formation of the adhesive layer. It is thought that this is because the binder resin, particularly the non-fluorinated binder resin, of the adhesive layer is introduced to the pores of the heat resistant layer during the formation of the adhesive layer, and thus the binding ratio between the heat resistant layer and the porous substrate is increased. When the polymer solution for an adhesive layer is applied to the surface of the heat resistant layer in the process for forming the adhesive layer, the fluorinated binder resin is concentrated at the surface of the adhesive layer due to humidified phase separation and the non-fluorinated binder resin is distributed near the surface portion of the heat resistant layer and may be introduced partially to the pores of the heat resistant layer. The dot-marked portion of the adhesive layer in FIG. 1 shows movement of the fluorinated binder to the surface portion schematically. In other words, as described above, the heat resistant layer has a porous structure formed by interstitial volumes among the inorganic particles, wherein the heat resistant layer includes a pore path passing through the thickness direction of the heat resistant layer by one pore or by interconnection of two or more open pores, and either or both of the fluorinated resin and the non-fluorinated binder resin of the adhesive layer are introduced through at least one pore path so that the heat resistant layer is bound with the surface of the porous substrate. As a result, it is possible to impart binding force between the adhesive layer and the porous substrate, resulting in an increase in peel strength. According to another embodiment of the present disclosure, an inorganic material layer is further formed on the surface of the heat resistant layer. When the adhesive layer is formed on the surface of the inorganic material layer, the non-fluorinated binder resin is introduced to the porous substrate through the porous structure of the inorganic material layer and heat resistant layer.

According to an embodiment of the present disclosure, the fluorinated binder resin includes a polyvinylidnee fluoride-based polymer resin containing vinylidene fluoride (VDF) as a monomer. The PVDF-based polymer resin may include polyvinylidene fluoride. In addition, the PVDF polymer resin may include copolymers of VDF as a monomer in combination with a comonomer, which includes hexafluoropropylene (HFP), chlorotrifluoroethylene (CTFE), hexafluoroisobutylene, perfluorobutyl ethylene, perfluoropropyl vinyl ether (PPVE), perfluoroethyl vinyl ether (PEVE), perfluromethyl vinyl ether (PMVE), perfluro-2,2-dimethyl-1,3-dioxole (PDD), perfluoro-2-methylene-4-methyl-1,3-dioxolane (PMD), or at least two of them. Particularly, the comonomer may include hexafluoropropylene (HFP), chlorotrifluoroethylene (CTFE) or both. In the PVDF-based polymer resin, the comonomer content is not particularly as long as it ranges from 3 wt % to 50 wt % based on the total weight of the PVDF-based polymer resin. For example, the comonomer content may be 5 wt % or more, and 30 wt % or less, 15 wt % or less, 12 wt % or less, or 10 wt % or less.

According to an embodiment of the present disclosure, the PVDF-based polymer resin includes polyvinylidene fluoride, polyvinylidene fluoride-co-hexafluoropropylene, polyvinylidene fluoride-co-trichloroethylene, polyvinylidene fluoride-co-tetrafluoroethylene, polyvinylidene fluoride-co-trifluoroethylene, polyvinylidene fluoride-co-trifluorochloroethylene and polyvinylidene fluoride-co-ethylene or a mixture of at least two of them.

In addition, according to an embodiment of the present disclosure, the non-fluorinated binder resin may include a (meth)acrylic polymer. The (meth)acrylic polymer includes (meth)acrylate as a monomer, and non-limiting examples of the polymer include (meth)acrylic polymers containing butyl (meth)acrylate, 2-ethylhexyl (meth)acrylate, ethyl (meth)acrylate, methyl (meth)acrylate, n-propyl (meth)acrylate, isopropyl (meth)acrylate, t-butyl (meth)acrylate, pentyl (meth)acrylate, n-octyl (meth)acrylate, isooctyl (meth)acrylate, isononyl (meth)acrylate, lauryl (meth)acrylate or tetradecyl (meth)acrylate as a monomer. In addition, the non-fluorinated binder resin may further include at least one selected from the group consisting of polyacrylonitrile, polyvinyl pyrrolidone, polyvinyl acetate, polyethylene-co-vinyl acetate, polyethylene oxide, polyacrylate, cyanoethyl pullulan, cyanoethyl polyvinyl alcohol, cyanoethyl cellulose, cyanoethyl sucrose, polyvinyl alcohol, pullulan and carboxymethyl cellulose. According to an embodiment of the present disclosure, the non-fluorinated polymer resin preferably includes a cyano group. Particularly, the non-fluorinated polymer resin preferably includes a polymer in which hydroxyl groups are substituted with cyano groups to a certain degree. According to an embodiment of the present disclosure, the non-fluorinated binder resin may include a binder including a polyvinyl alcohol chain substituted with cyano groups with a substitution degree of 1-95 wt %. According to the present disclosure, the substitution degree may be 50 wt % or more, 60 wt % or more, 70 wt % or more, or 80 wt % or more, within the above-defined range. In addition, the non-fluorinated binder resin may include cyanoethyl polyvinyl alcohol, for example.

As described above, the separator according to the present disclosure includes a high-melting point resin in the heat resistant layer, and thus shows improved safety during use. In this context, the separator according to the present disclosure shows a shrinkage of 25% or less, preferably 20% or less, both in the machine direction (MD) and transverse direction (TD) after 30 minutes at 150° C. In addition, the separator according to the present disclosure has a break down voltage of 1.8 kV or more. In addition, the separator according to the present disclosure shows a peel strength of 20 gf/15 mm or more between the heat resistant layer and the porous substrate.

According to the present disclosure, 'break down voltage' means the voltage at which point an insulator loses insulation property and shows increased conductivity, when voltage application to the insulator is increased and reaches to a high voltage above a specific voltage. Such a break down voltage is determined by allowing direct current to flow through an insulator disposed between metal plates under a predetermined condition of increasing voltage.

According to the present disclosure, 'peel strength' is determined by attaching a double-sided tape to the surface of slide glass, attaching a separator to the tape, and measuring the strength at the point where the separator porous substrate and the heat resistant layer are peeled off from each other under a specific condition.

Then, the method for manufacturing the separator according to the present disclosure will be explained.

For example, the method for manufacturing the separator according to the present disclosure may include the steps of: (a) dissolving a binder resin in a solvent to form a polymer solution for a heat resistant layer; (b) adding inorganic particles to the resultant polymer solution of step (a) and mixing them to obtain slurry for forming a heat resistant layer; (c) coating the resultant slurry of step (b) to either surface or both surfaces of a porous substrate, followed by drying, to form a heat resistant layer; (d) preparing a polymer solution for forming an adhesive layer; and (e) applying the polymer solution for forming an adhesive layer to the heat resistant layer, followed by drying, to form an adhesive layer.

Hereinafter, the above-mentioned steps will be explained in more detail.

First, a binder resin is dissolved in an adequate solvent to form a polymer solution for a heat resistant layer (a). The binder resin is the same as defined herein with reference to the heat resistant layer. The solvent preferably has a solubility parameter similar to the solubility parameter of the binder resin to be used and has a low boiling point. Such a solvent allows homogeneous mixing of binder resin and facilitates solvent removal in the subsequent drying step. Non-limiting examples of the solvent that may be used include at least one selected from tetrahydrofuran, methylene chloride, chloroform, dimethyl formamide, N-methyl-2-pyrrolidone (NMP), cyclohexane and water.

Next, inorganic particles are added to and dispersed in the polymer solution for a heat resistant layer obtained from the preceding step to form slurry for forming a heat resistant layer containing the inorganic particles and binder resin (b). According to an embodiment of the present disclosure, the inorganic particles may be pulverized after they are added to the polymer solution. Herein, the pulverization time is suitably 1-20 hours and the pulverized inorganic particles have the particle size as described above. As mentioned above, the inorganic particles may have a particle size controlled to 50 nm to 20 μm adequately. The pulverization may be carried out by the conventional methods, such as ball milling.

The composition of the slurry containing the inorganic particles and binder resins is not particularly limited. Thus, the composition may be controlled adequately depending on the thickness, pore size and porosity of the finally formed heat resistant layer according to the present disclosure.

In other words, as the ratio (I/P) of inorganic particles (I) to binder resins (P) is increased, the heat resistant layer has increased porosity, resulting in an increase in thickness of the heat resistant layer at the same solid content (weight of inorganic particles+weight of binder resin). In addition, pore formability is increased among the inorganic particles to cause an increase in pore size. In this case, as the size (particle diameter) of inorganic particles is increased, interstitial distance between inorganic particles is increased, resulting in an increase in pore size.

Then, the prepared slurry for forming a heat resistant layer is coated on the porous substrate, followed by drying, to form a heat resistant layer (c).

Methods for coating the slurry for forming a heat resistant layer on the porous substrate are those generally known to skilled in the art. Particular examples of such methods include dip coating, die coating, roll coating, comma coating, or a combination thereof.

Meanwhile, depending on the viscosity or concentration of the slurry, the slurry may infiltrate into a part of pores opened toward the surface on which the slurry is applied.

According to an embodiment of the present disclosure, a ceramic layer may be further formed on the surface of the heat resistant layer. Reference will be made to the above-described method for forming a ceramic layer.

After that, an adhesive layer is formed on the surface of the heat resistant layer. If a ceramic layer is formed on the surface of the heat resistant layer, the adhesive layer is formed on the surface of the ceramic layer. To form the adhesive layer, an adhesive binder resin is dissolved in an adequate solvent to obtain a polymer solution (d). As described above, the adhesive resin includes at least one fluorinated polymer and at least one non-fluorinated polymer. The solvent preferably has a solubility parameter similar to the solubility parameter of the binder resin to be used and has a low boiling point. Such a solvent allows homogeneous mixing and facilitates the subsequent solvent removal. Non-limiting examples of the solvent that may be used include at least one selected from acetone, tetrahydrofuran, methylene chloride, chloroform, dimethyl formamide, N-methyl-2-pyrrolidone (NMP), cyclohexane and water. According to an embodiment of the present disclosure, the solid content in the polymer solution may be 1-10 wt %.

Then, the polymer solution for forming an adhesive layer is applied to the surface of the heat resistant layer, followed by drying, to form an adhesive layer (e). According to an embodiment of the present disclosure, the polymer solution for forming an adhesive layer may be dried through humidification carried out at a relative humidity of 20-50%. According to an embodiment, the relative humidity may be controlled preferably to 35% or less, or 30% or less, considering pore formation in the adhesive layer and resistance characteristics. The fluorinated binder resin in the polymer solution is moved to the surface portion of the adhesive layer through the humidification so that it may be concentrated at the upper layer portion of the adhesive layer. In other words, through the humidification, a fluorinated binder layer is formed at the surface portion of the adhesive layer and the non-fluorinated binder remains in the lower portion of the adhesive layer or infiltrates to the pore portion of the heat resistant layer. When the relative humidity is less than 20%, the amount of the fluorinated binder resin moved to the surface is reduced so that phase separation between the fluorinated binder resin and the non-fluorinated binder resin is not performed sufficiently. On the other hand, when the relative humidity is higher than the above-defined range, the binder resin of the adhesive layer is gelled or the fluorinated binder resin is concentrated excessively near the surface of the adhesive layer so that the fluorinated binder resin may cause interlayer separation from the non-fluorinated binder layer.

According to an embodiment of the present disclosure, phase separation of the adhesive layer may be carried out by applying a non-solvent to the surface of slurry, or by dipping the separator coated with the polymer solution for forming an adhesive layer in a bath containing a non-solvent, after applying the polymer solution for forming an adhesive layer and before carrying out drying. In addition, the non-solvent may include at least one selected from methanol, ethanol, isopropyl alcohol (IPA), propanol, butanol and combinations thereof, but is not limited thereto. Any non-solvent may be used, as long as it is used conventionally in the art.

According to another embodiment of the present disclosure, the polymer solution for forming an adhesive layer may further include a non-solvent. In this case, it is possible to accelerate phase separation. It is also possible to effectively realize a fine three-dimensional structure obtained by interconnection of backbones of binder resin formed through organic phase separation of the non-solvent during the drying of the polymer solution. According to an embodiment of the present disclosure, the non-solvent may be used in an amount of 1-10 wt % based on 100 wt % of the polymer solution for forming an adhesive layer.

In another aspect, there is provided an electrochemical device including the above-described separator. According to the present disclosure, the electrochemical device includes any device which carries out electrochemical reaction, and particular examples thereof include all types of primary batteries, secondary batteries, fuel cells, solar cells or capacitors, such as super capacitor devices. Particularly, among the secondary batteries, lithium secondary batteries, including lithium metal secondary batteries, lithium ion secondary batteries, lithium polymer secondary batteries or lithium ion polymer batteries, are preferred.

According to an embodiment of the present disclosure, the lithium secondary battery includes a positive electrode, a negative electrode, and a separator interposed between the negative electrode and the positive electrode, wherein the separator is the separator according to the present disclosure.

The negative electrode may be obtained by applying negative electrode slurry including a negative electrode active material, a conductive material and a binder resin onto a negative electrode current collector, followed by drying. In general, the negative electrode active material includes one used currently in a negative electrode for an electrochemical device, and particular examples thereof include carbonaceous materials, such as artificial graphite and natural graphite, lithium metal, Sn-based alloys, Si-based alloys, or the like. The negative electrode current collector is a highly conductive metal. Any metal may be used, as long as it allows easy adhesion of a negative electrode mixture and has no reactivity in a voltage range of the corresponding electrochemical device. The current collector is not particularly limited, and particular examples thereof include stainless steel, aluminum, nickel, titanium, baked carbon, or aluminum or stainless steel surface-treated with carbon, nickel, titanium, silver, or the like. In addition, fine surface irregularities may be formed on the surface of the current collector to increase the adhesion of the negative electrode active material. The current collector may have various shapes, such as a film, sheet, foil, net, porous body, foam, non-woven body, or the like. Particularly, the current collector may be foil including aluminum, nickel or a combination thereof or may be formed by stacking substrates made of the above-mentioned materials.

The positive electrode may be obtained by applying a mixture of a positive electrode active material, a conductive material and a binder onto a positive electrode current collector, followed by drying. If desired, the mixture may further include a filler. Particular examples of the positive electrode active material include, but are not limited to: layered compounds such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); $LiMn_2O_4$ in which Li is partially substituted with an alkaline earth metal ion; disulfide compounds; $Fe_2$ ($MoO_4$)$_3$; or the like.

In general, the positive electrode current collector is formed to have a thickness of 3-500 μm. The positive electrode current collector is not particularly limited, as long as it causes no chemical change in the corresponding battery and has high conductivity. Particular examples of the current collector may include stainless steel, aluminum, nickel, titanium, baked carbon, aluminum or stainless steel surface-treated with carbon, nickel, titanium or silver, or the like. In addition, fine surface irregularities may be formed on the surface of the current collector to increase the adhesion of the positive electrode active material. The current collector may have various shapes, such as a film, sheet, foil, net, porous body, foam, non-woven body, or the like.

The binder for a positive electrode or negative electrode is an ingredient which assists binding between the electrode active material and the conductive material and binding to the current collector. In general, the binder is added in an amount of 1-50 wt % based on the total weight of the electrode mixture. High-molecular weight polyacrylonitrile-co-acrylic acid may be used as a binder but the scope of the present disclosure is not limited thereto. Other examples of the binder include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butyrene rubber, fluororubber, various copolymers, or the like.

The secondary battery according to the present disclosure may be obtained by receiving and sealing an electrode assembly including positive electrodes and negative electrodes stacked alternatively with separators interposed therebetween in a casing material, such as a battery casing, together with an electrolyte. Any conventional methods for manufacturing a secondary battery may be used with no particular limitation Hereinafter, the present disclosure will be explained in detail with reference to Examples. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

EXAMPLES

1. Manufacture of Separator

Example 1 and Example 2

Aramid resin was introduced to N-methyl-2-pyrrolidone (NMP) and dissolved therein to prepare a polymer solution for forming a heat resistant layer, and alumina ($Al_2O_3$, average particle diameter 0.5 μm) was added thereto to form slurry for forming a heat resistant layer. A polypropylene film (thickness 7 μm, air permeation time 100 s/100 mL, porosity 32%) was used as a porous substrate, and the slurry was coated on both surfaces of the porous substrate through dip coating, followed by drying, to obtain a separator having heat resistant layers each having a thickness of 1.5 μm on both surfaces thereof. The resultant separator had a total thickness of 10.5 μm and an air permeation time of 228 sec/100 mL.

Next, an adhesive layer was formed on the surface of the heat resistant layer. Polyvinylidene fluoride-co-hexafluoro-propylene (PVDF-HFP, HFP 8 wt %) and cyanoethyl poly-vinyl alcohol (cyanoetyl substitution degree 80%) were introduced to acetone to prepare a polymer solution for forming an adhesive layer. The content of PVDF-HFP and that of cycanoethyl polyvinyl alcohol were the same as shown in the following Table 1. The solution had a solid content of 3 wt %. In addition, about 6 wt % of isopropyl alcohol was added to the polymer solution as a non-solvent. The prepared polymer solution for forming an adhesive layer was applied to both surfaces of the separator through dip coating and vacuum dried under a condition of humidity controlled to 30-35% to obtain a separator having adhesive layers on the surface thereof. In the separator, the adhesive layers were formed on both surfaces to a total thickness of 2 wherein each adhesive layer had a thickness of about 1 μm. The separator had a total thickness of 12.4 μm and an air permeation time of 271 sec/100 mL.

Comparative Example 1

Aramid resin was introduced to NMP and dissolved therein to prepare a polymer solution for forming a heat resistant layer, and alumina ($Al_2O_3$, average particle diameter 0.5 μm) was added thereto to form slurry for forming a heat resistant layer. A polypropylene film (thickness 7 μm, air permeation time 100 s/100 mL, porosity 32%) was used as a porous substrate, and the slurry was coated on both surfaces of the porous substrate through dip coating, followed by drying, to obtain a separator having heat resistant layers each having a thickness of 1.5 μm on both surfaces thereof. The resultant separator had a total thickness of 10.5 μm and an air permeation time of 228 sec/100 mL.

Next, an adhesive layer was formed on the surface of the heat resistant layer. PVDF-HFP (HFP 8 wt %) was introduced to acetone to prepare a polymer solution for forming an adhesive layer. The solution had a solid content of 3 wt %. In addition, about 6 wt % of isopropyl alcohol was added to the polymer solution as a non-solvent. The prepared polymer solution for forming an adhesive layer was applied to both surfaces of the separator through dip coating and vacuum dried under a condition of humidity controlled to 30-35% to obtain a separator having adhesive layers. In the separator, the adhesive layers were formed on both surfaces to a total thickness of 2 μm, wherein each adhesive layer had a thickness of about 1 μm. The separator had a total thickness of 12.4 μm and an air permeation time of 268 sec/100 mL.

Comparative Example 2

Aramid resin (meta-aramid) was introduced to NMP and dissolved therein to prepare a polymer solution for forming a heat resistant layer, and alumina ($Al_2O_3$, average particle diameter 0.5 μm) was added thereto to form slurry for forming a heat resistant layer. The aramid resin and alumina were used at a weight ratio of 80:20. In addition, the slurry for a heat resistant layer had a solid content of 5.5 wt %. A polypropylene film (thickness 7 μm, air permeation time 100 s/100 mL, porosity 32%) was used as a porous substrate, and the slurry was coated on both surfaces of the porous substrate through dip coating, followed by drying, to obtain a separator having heat resistant layers each having a thickness of 1.5 μm on both surfaces thereof. The resultant separator had a total thickness of 10.5 μm and an air permeation time of 228 sec/100 mL.

Comparative Example 3

PVDF were introduced to acetone and dissolved therein to prepare a polymer solution, and alumina ($Al_2O_3$, average particle diameter 0.5 μm) was added and dispersed thereto to form slurry for an inorganic coating layer. A polypropylene film (thickness 7 μm, air permeation time 100 s/100 mL, porosity 32%) was used as a porous substrate, and the slurry was coated on both surfaces of the porous substrate through dip coating, followed by drying, to obtain a separator having inorganic coating layers each having a thickness of 1.5 μm on both surfaces thereof. The resultant separator had a total thickness of 10.5 μm and an air permeation time of 228 sec/100 mL.

TABLE 1

| | | Heat resistant layer | | | |
| | | Binder | Inorganic | Adhesive layer | |
| | Porous substrate | resin (wt %) | particles (wt %) | Resin a (wt %) | Resin b (wt %) |
|---|---|---|---|---|---|
| Example 1 | Polypropylene film | Aramid (90 wt %) | $Al_2O_3$ (10 wt %) | PVDF-HFP (97 wt %) | Cyano-ethyl polyvinyl alcohol (3 wt %) |
| Example 2 | Polypropylene film | Aramid (90 wt %) | $Al_2O_3$ (10 wt %) | PVDF-HFP (90 wt %) | Cyano-ethyl polyvinyl alcohol (10 wt %) |
| Comp. Ex. 1 | Polypropylene film | Aramid (90 wt %) | $Al_2O_3$ (10 wt %) | PVDF-HFP (100 wt %) | — |
| Comp. Ex. 2 | Polypropylene film | Aramid (90 wt %) | $Al_2O_3$ (10 wt %) | — | — |
| Comp. Ex. 3 | Polypropylene film | PVDF (90 wt %) | $Al_2O_3$ (10 wt %) | — | — |

2. Heat Shrinking Test

Each of the separators according to Example 1 and Comparative Example 3 was formed into a sample of 50 mm×50 mm. The sample was allowed to stand in an oven at 150° C. for 30 minutes to determine heat shrinkage. The results are shown in the following Table 2. Example 1 shows excellent heat shrinking property as compared to Comparative Example 3 including a PVDF-based polymer alone in the heat resistant layer.

TABLE 2

| | Heat shrinkage (%) | |
| | MD | TD |
|---|---|---|
| Example 1 | 15% | 14% |
| Comp. Ex. 3 | 30% | 28% |

3. Peel Strength Test Results

The peel strength between a porous substrate and a heat resistant layer was determined under the following conditions. Each of the separator samples according to Examples 1 and 2 and Comparative Examples 1 and 2 was formed into a size of 1.5 cm×10 cm. A double-sided tape available from 3M Company was attached to slide glass and each of the separators according to Examples and Comparative Examples of the following Table 3 was attached to the double-sided tape. A universal testing machine (UTM) was used with 10N load cell in a 180° mode at a rate of 300 mm/min. The results are shown in the following Table 3.

TABLE 3

| | Peel strength (gf/15 mm) |
|---|---|
| Example 1 | 22 |
| Example 2 | 23 |
| Comp. Ex. 1 | 13 |
| Comp. Ex. 2 | 12 |

Table 3 shows the results of the peel strength between the porous substrate and the heat resistant layer in each sample. As can be seen from Table 3, each of the separators according to Examples shows higher peel strength between the porous substrate and the heat resistant layer, as compared to the separators according to Comparative Examples. Comparative Example 1 includes an adhesive layer but no fluorinated binder is used for forming the adhesive layer. In addition, Comparative Example 2 includes no adhesive layer. It can be seen from the above results that formation of an adhesive layer and use of a non-fluorinated binder for forming an adhesive layer provide improve peel strength between a heat resistant layer and a porous substrate.

4. Break Down Voltage

Each of the separators of the following Table 4 was prepared with a size of 65×210 mm and the test was carried out in a dry room. The prepared sample was positioned between an aluminum jig and a copper jig. The break down voltage was determined under a direct current (DC) condition at a current of 0.5 mA and a voltage increasing rate of 100 V/s (up to 3 kV). The test results are shown in Table 4. As can be seen from Table 4, Example 1 retains insulation to a higher voltage as compared to Comparative Example 3 including no adhesive layer.

TABLE 4

| | Break down voltage (kV) |
|---|---|
| Example 1 | 2.3 |
| Comp. Ex. 3 | 1.5 |

DESCRIPTION OF DRAWING NUMERALS

100: Separator
110: Porous substrate
120: Heat resistant layer
130: Adhesive layer

What is claimed is:

1. A separator for an electrochemical device comprising:
a porous substrate;
a heat resistant layer formed on at least one surface of the porous substrate; and
an adhesive layer formed on a surface of the heat resistant layer opposite the porous substrate,
wherein:
the heat resistant layer comprises inorganic particles and a heat resistant binder resin,
the heat resistant binder resin has a melting point (Tm) of 150° C. or higher,
the adhesive layer consists of a fluorinated binder resin and a non-fluorinated binder resin as adhesive binder resins,
the non-fluorinated binder resin comprises a (meth)acrylic polymer,
the fluorinated binder resin is concentrated at a surface of the adhesive layer and the non-fluorinated binder resin is concentrated near a surface of the heat resistant layer, and
the heat resistant layer comprises pores and the non-fluorinated binder resin is partially present in the pores of the heat resistant layer.

2. The separator for the electrochemical device according to claim 1, wherein the heat resistant layer comprises the heat resistant binder resin in an amount of 1 wt % to 20 wt % based on 100 wt % of the heat resistant layer.

3. The separator for the electrochemical device according to claim 2, wherein
the heat resistant binder resin is present in an amount larger than 90 wt % based on 100 wt % of the binder resin present in the heat resistant layer.

4. The separator for the electrochemical device according to claim 1, wherein the heat resistant layer comprises a pore path passing through a thickness direction of the heat resistant layer by one pore or by interconnection of two or more open pores, and
either or both of the fluorinated binder resin and the non-fluorinated binder resin of the adhesive layer are introduced through at least one pore path so that the heat resistant layer is bound with the surface of the porous substrate.

5. The separator for the electrochemical device according to claim 1, which has a shrinkage of 25% or less in a transverse direction (TD) and machine direction (MD), after it is allowed to stand at 150° C. for 30 minutes.

6. The separator for the electrochemical device according to claim 1, which has a breakdown voltage of 1.8 kV or higher.

7. The separator for the electrochemical device according to claim 1, which shows a peel strength of 20 gf/15 mm or more between the heat resistant layer and the porous substrate.

8. The separator for electrochemical device according to claim 1, wherein the heat resistant binder resin comprises polyacetal, polysulfone (PSF), polyethersulfone (PES), polyetherimide (PEI), polyphenylene sulfide (PPS), polyetherether ketone (PEEK), polyarylate (PA), polycarbonate, polyamideimide (PAI), polyimide (PI), polyamide, fully aromatic polyamide (aramid), polyphenylene oxide, polybutylene terephthalate, polyethylene terephthate, polyether sulfone, polyether ketone or a mixture of at least two of them.

9. The separator for the electrochemical device according to claim 1, wherein the fluorinated binder resin comprises a polyvinylene fluoride (PVDF)-based polymer resin comprising vinylidene fluoride (VDF) as a unit.

10. The separator for the electrochemical device according to claim 1, wherein the fluorinated binder resin comprises a copolymer of vinylidene fluoride (VDF) with a comonomer, and the comonomer comprises hexafluoropropylene (HFP), chlorotrifluoroethylene (CTFE), hexafluoroisobutylene, perfluorobutyl ethylene, perfluoropropyl vinyl ether (PPVE), perfluoroethyl vinyl ether (PEVE), perfluromethyl vinyl ether (PMVE), perfluro-2,2-dimethyl-1,3-dioxole (PDD), perfluoro-2-methylene-4-methyl-1,3-dioxolane (PMD) or at least two of them.

11. A method for manufacturing the separator of claim 1 comprising the steps of:
(S10) forming a heat resistant layer on a surface of a porous substrate;
(S20) applying a polymer solution for forming an adhesive layer to a surface of the heat resistant layer opposite the porous substrate; and
(S30) drying the applied polymer solution to form an adhesive layer,
wherein the drying in step (S30) is carried out under a humidifying treatment condition at a relative humidity of 20-50%.

12. The method for manufacturing the separator according to claim 11, wherein the polymer solution for forming the adhesive layer comprises a fluorinated binder resin, a non-fluorinated binder resin, a solvent and a non-solvent.

13. The separator for the electrochemical device according to claim 1, wherein the adhesive layer has pores having a rectangular finger-like structure, Bernard cell structure, or a mesoporous structure in a thickness direction.

14. The separator for the electrochemical device according to claim 1, wherein the non-fluorinated binder resin is present in an amount of 1 wt % to 20 wt % based on 100 wt % of the binder resins in the adhesive layer.

15. A secondary battery comprising a cathode, an anode and a separator according to claim 1 and the separator is interposed between the cathode and the anode.

* * * * *